US008777438B2

(12) United States Patent
Chang et al.

(10) Patent No.: US 8,777,438 B2
(45) Date of Patent: Jul. 15, 2014

(54) DIRECT TYPE BACKLIGHT UNIT AND LIQUID CRYSTAL DISPLAY DEVICE USING THE SAME

(75) Inventors: Kuang-Yao Chang, Guangdong (CN); Zan-Jia Su, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 20 days.

(21) Appl. No.: 13/639,484

(22) PCT Filed: Aug. 2, 2012

(86) PCT No.: PCT/CN2012/079567
§ 371 (c)(1),
(2), (4) Date: Oct. 4, 2012

(87) PCT Pub. No.: WO2013/189116
PCT Pub. Date: Dec. 27, 2013

(65) Prior Publication Data
US 2013/0343040 A1 Dec. 26, 2013

(30) Foreign Application Priority Data
Jun. 20, 2012 (CN) .......................... 2012 1 0204446

(51) Int. Cl.
*G09F 13/04* (2006.01)
(52) U.S. Cl.
USPC ........................................ 362/97.3; 362/97.1

(58) Field of Classification Search
USPC ................................................. 362/97.1–97.4
See application file for complete search history.

(56) References Cited

U.S. PATENT DOCUMENTS

| 8,104,909 | B2 * | 1/2012 | Shin ............................... 362/97.1 |
| 8,579,455 | B2 * | 11/2013 | Li et al. ......................... 362/97.3 |
| 2007/0047225 | A1 | 3/2007 | Sudo |
| 2008/0030648 | A1 | 2/2008 | Morita et al. |
| 2011/0134629 | A1 * | 6/2011 | Kim ............................... 362/97.1 |
| 2013/0128128 | A1 * | 5/2013 | Ikuta .............................. 348/790 |
| 2013/0321717 | A1 * | 12/2013 | Kuromizu ..................... 348/790 |

FOREIGN PATENT DOCUMENTS

| CN | 101641633 A | 2/2010 |
| JP | 2007322697 A | 12/2007 |
| JP | 2011086553 A | 4/2011 |

* cited by examiner

*Primary Examiner* — Evan Dzierzynski
(74) *Attorney, Agent, or Firm* — Muncy, Geissler, Olds & Lowe, P.C.

(57) ABSTRACT

A direct type backlight unit includes an optical film, a diffusion plate for supporting the optical film, a bottom plate disposed under the diffusion plate, a plurality of light emitted diodes disposed between the diffusion plate and the bottom plate, and a plurality of support structures disposed between the diffusion plate and the bottom plate and fixed on the bottom plate, wherein each support structure is disposed between two adjacent light emitting diodes, a height of each support structure is smaller than a distance between the bottom plate and the diffusion plate. The direct type backlight unit can improve the problem that a dark area occurs on the diffusion plate.

9 Claims, 5 Drawing Sheets

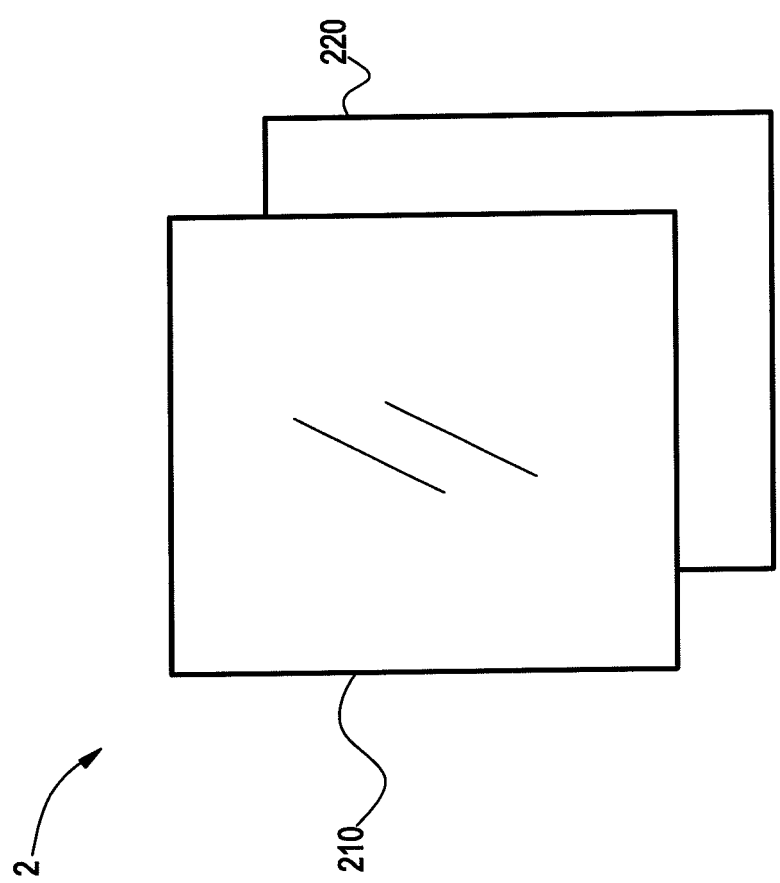

DIRECT TYPE BACKLIGHT UNIT AND LIQUID CRYSTAL DISPLAY DEVICE USING THE SAME

FIELD OF THE INVENTION

The present invention relates to a direct type backlight unit and a liquid crystal display device using the same, and more particularly to a support structure which can improve a dark area problem

BACKGROUND OF THE INVENTION

Recently, a direct-type backlight unit using light emitting diodes (LEDs) is capable of local dimming, has high luminance uniformity and no mercury pollution problem, such that the direct-type backlight unit becomes popular. The direct-type backlight unit can be implemented by two conventional methods. In the first method, a surface mount type LED is adopted, but this method normally requires a large number of LEDs. On the other hand, in the second method, a surface mount type LED and a second lens are used together, which can reduce the number of LEDs used. However, no matter what method is used, it requires a support structure to support the diffusion plate for preventing deformation of the diffusion plate caused by thermal expansion, handling and transportation, which may reduce optical performance and damage LEDs if the height of a cavity accommodating the diffusion plate and the LEDs is low.

Please refer to FIG. 1, it is a structure view of a conventional direct-type backlight unit. The backlight unit comprises: an optical sheet 940, a diffusion plate 960, a bottom plate 910, a plurality of LEDs, and a plurality of support structures 930. For convenience of explanation, FIG. 1 only shows two LEDs 920 and a support structure 930.

The optical sheet 940 is disposed on the diffusion plate 960; the bottom plate 910 is disposed below the diffusion plate 960; the LEDs 920 are disposed between the diffusion plate 960 and the bottom plate 910; the support structure 930 is disposed between the diffusion plate 960 and the bottom plate 910, and one end of the support structure 930 is fixed on the bottom plate 910 and the other end of the support structure 930 is contacted with the diffusion plate 960.

Please refer to FIG. 3, it is a luminous intensity distribution curve of the LED 920 with an additional secondary lens. The black line 8 in the FIG. 3 shows an LED having bat-type light field with different luminous intensities in different angles. In addition, from FIG. 3, the light intensity in the two lateral sides is stronger than that of the middle portion in the LED.

Please see FIG. 2, when the LEDs 920 emit light, the light is emitted into a bat shape. However, the light is blocked by the support structure 930 and can't pass through, resulting in a dark area 950 on the diffusion plate 960.

Therefore, it is required to provide a novel backlight unit and a crystal display device using the same in order to solve the dark area problem on the diffusion plate.

SUMMARY

One objective of the present invention is to overcome the drawbacks of the conventional backlight unit that a dark area occurs on a diffusion plate when a support structure is located on a light traveling path, such that the quality of images is affected. The present invention provides a novel backlight unit in order to solve the above-mentioned problems.

Another objective of the present invention is to overcome the drawbacks of the conventional liquid crystal display device having a backlight unit that a dark area occurs on a diffusion plate when a support structure is located on a light traveling path, such that the quality of images is affected. The present invention provides a novel liquid crystal display device having a backlight unit in order to solve the above-mentioned problems.

To solve above-mentioned problems, the present invention provides a direct type backlight unit comprising an optical film; a diffusion plate for supporting the optical film; a bottom plate disposed under the diffusion plate; a plurality of light emitted diodes disposed between the diffusion plate and the bottom plate; and a plurality of support structures disposed between the diffusion plate and the bottom plate and fixed on the bottom plate, wherein each support structure is disposed between two adjacent light emitting diodes, a height of each support structure is smaller than a distance between the bottom plate and the diffusion plate.

In one embodiment, a distance between the bottom plate and the diffusion plate is a cavity height (Hc), a distance between the bottom plate and a top end of the support structure is a support structure height (Hs), a distance between the support structure and the light emitting diode is a spacing (S), wherein the cavity height (Hc), the support structure height (Hs), and the spacing (S) need to satisfy an equation of $(Hc-Hs) \times S/Hs \geq 3.5$ mm.

In one embodiment, the surface of the support structure of the backlight unit is a polishing surface, a frosting surface, a reflector surface, or a scattering surface.

In one embodiment, the cross-section of the support structure of the backlight unit is a circle shape, an elliptic shape, a regular polygon shape, an irregular polygon shape, or a saw-tooth shape.

In one embodiment, the support structure of the backlight unit is a pyramid, a cone, a cylinder, or a prism.

To solve above-mentioned problems, the present invention provides a liquid crystal display device comprising: a liquid crystal panel; and a direct type backlight unit for providing light to the liquid crystal panel, comprising: an optical film; a diffusion plate for supporting the optical film; a bottom plate disposed under the diffusion plate; a plurality of light emitted diodes disposed between the diffusion plate and the bottom plate; and a plurality of support structures disposed between the diffusion plate and the bottom plate and fixed on the bottom plate, wherein each support structure is disposed between two adjacent light emitting diodes, and a height of each support structure is smaller than a distance between the bottom plate and the diffusion plate.

In one embodiment, the surface of the support structure of the liquid crystal display device is a polishing surface, a frosting surface, a reflector surface, or a scattering surface.

In one embodiment, the cross-section of the support structure of the liquid crystal display device is a circle shape, an elliptic shape, a regular polygon shape, an irregular polygon shape, or a saw-tooth shape.

In one embodiment, the support structure of the liquid crystal display device is a pyramid, a cone, a cylinder, or a prism.

In conclusion, the direct type backlight unit and the liquid crystal display device using the same of the present invention have the following advantageous effect: by reducing a height of the support structure, a spacing is existed between the structure support and an optical film; therefore, the light emitted from LEDs can pass through the spacing between the support structure and the diffusion plate, such that it can improve the problem that a dark area occurs on the diffusion plate.

In order to make the aforementioned features and advantages of the present invention more comprehensible, embodiments accompanied with figures are described in detail below.

BRIEF DESCRIPTION OF THE DRAWINGS

FIG. 5 illustrates a liquid crystal display device according to an embodiment of the present invention.

DETAILED DESCRIPTION

Now, the preferred embodiment of the present invention will be described in detail with reference to the accompanying drawings.

Figure 1:
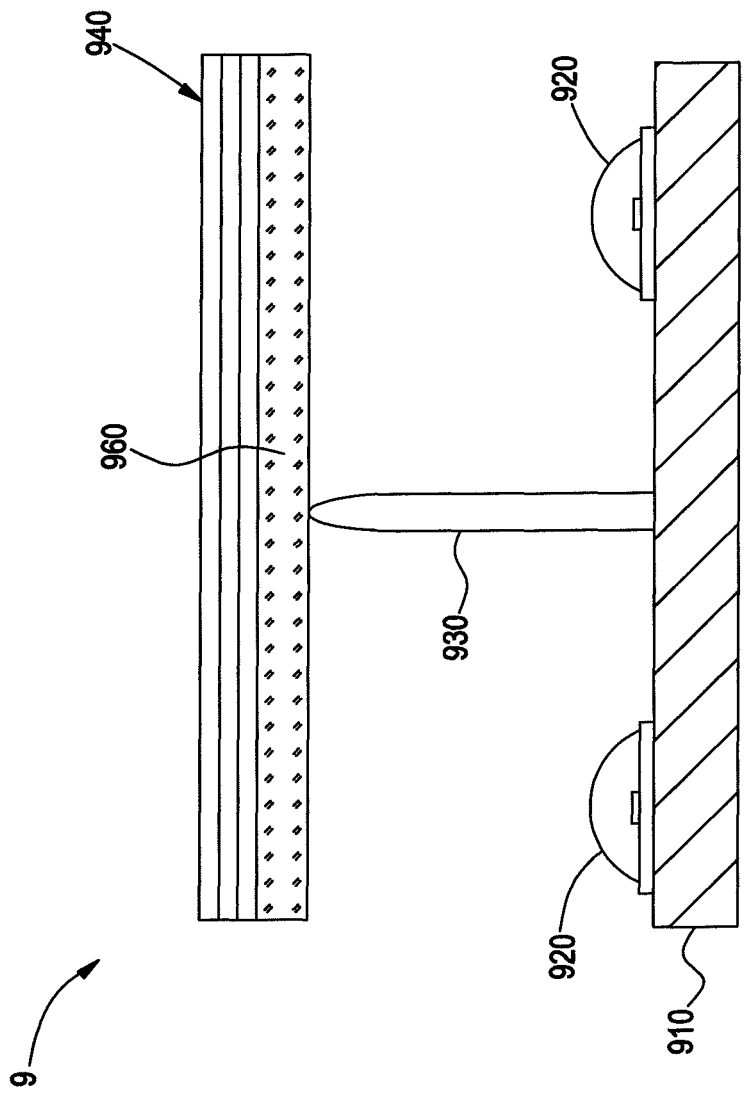
FIG. 1 illustrates a partial structure of a conventional direct type backlight unit.
Figure 2:
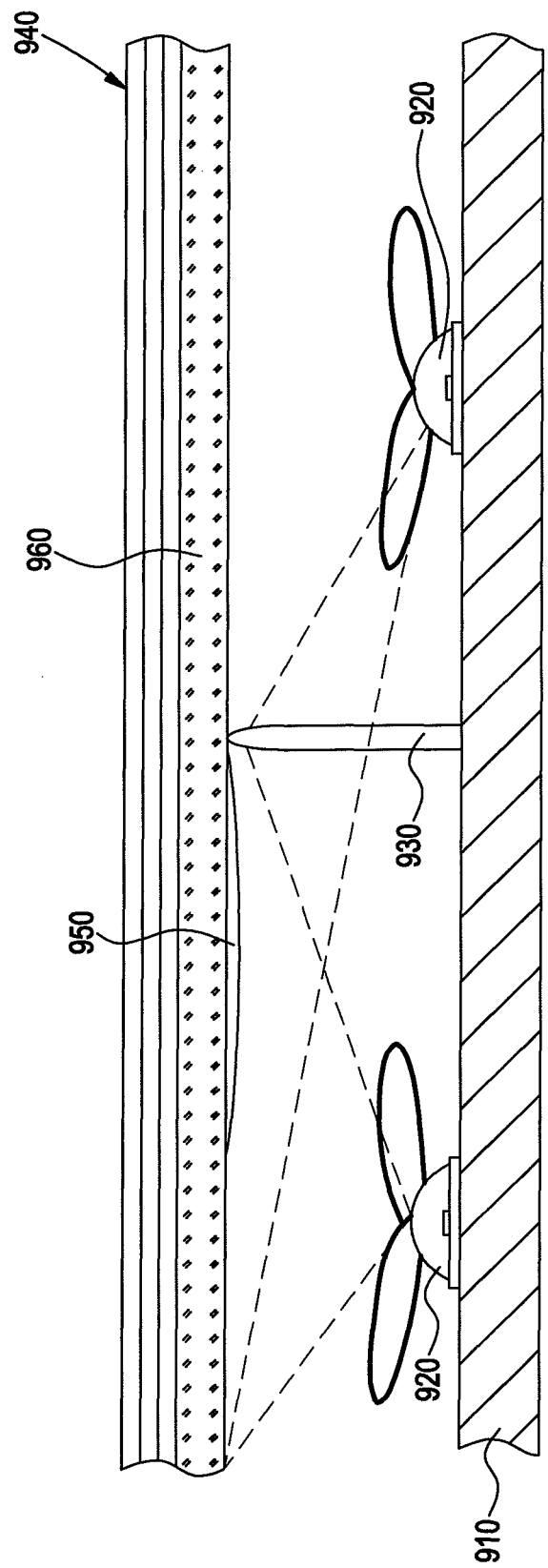
FIG. 2 illustrates a partial structure of a conventional direct type backlight unit when a light emitting diode emits light.
Figure 3:
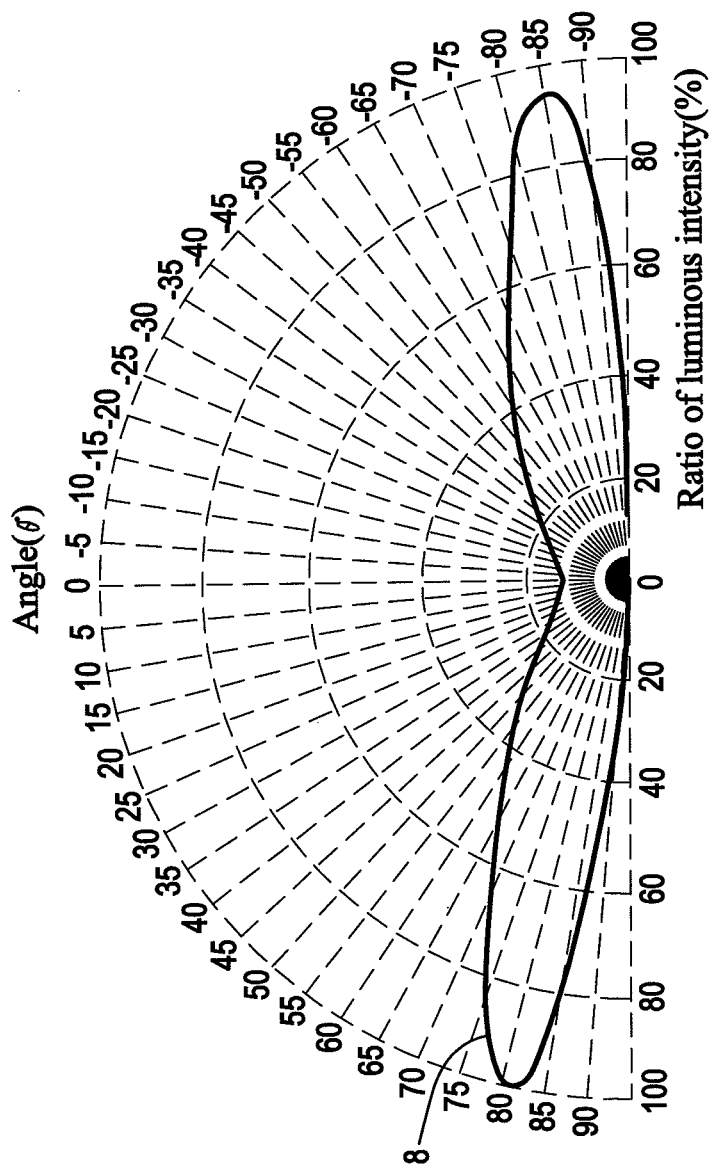
FIG. 3 illustrates a luminous intensity distribution curve of LEDs with an additional secondary lens.
Figure 4:
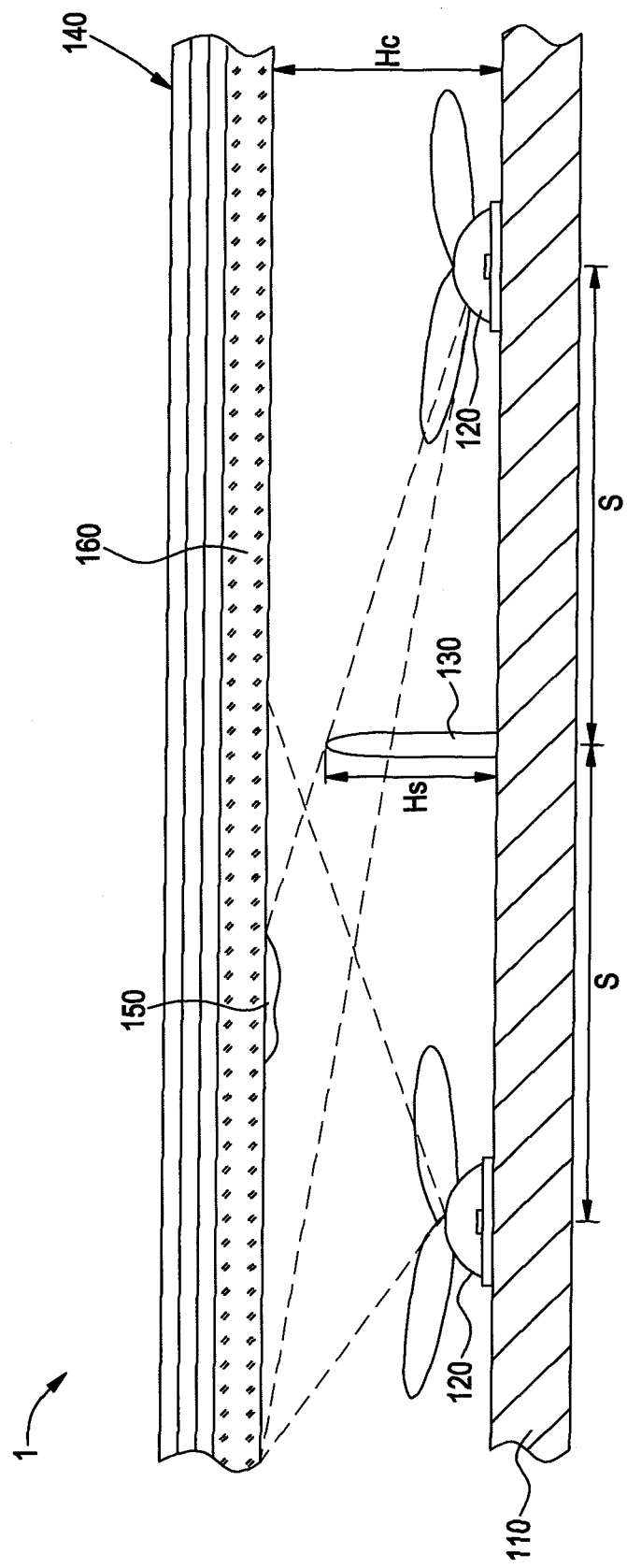
FIG. 4 is a cross-sectional view of a direct type backlight unit according to an embodiment of the present invention.

Referring to FIG. 4, it is a cross-sectional view of a direct type backlight unit according to an embodiment of the present invention. As shown in FIG. 4, the direct type backlight unit 1 comprises an optical film 140, a diffusion plate 160, a bottom plate 110, a plurality of LEDs 120, and a plurality of support structures 130. In order to describe conveniently, FIG. 4 only shows two LEDs 120 and a support structure 130.

The optical film 140 is disposed on the diffusion plate 160. The bottom plate 110 is disposed under the diffusion plate 160. The LEDs 120 are disposed between the diffusion plate 160 and the bottom plate 110, and fixed on the bottom plate 110. The supporting structures 130 are disposed between the diffusion plate 160 and the bottom plate 100, and fixed on the bottom plate 110, wherein each support structure 130 is disposed between two adjacent LEDs 120, and a height of each support structure 130 is smaller than a distance between the bottom plate 110 and the diffusion plate 160.

The distance between the bottom plate 110 and the diffusion plate 160 is a cavity height (Hc), a distance between the bottom plate 110 and a top end of the support structure 130 is a support structure height (Hs), a distance between the support structure 130 and the light emitting diode 120 is a spacing (S), wherein the cavity height (Hc), the support structure height (Hs), and the spacing (S) need to satisfy an equation of $(Hc-Hs) \times S/Hs \geq 3.5$ mm. When the LED 120 emits a light, the light can pass through the spacing between the support structure 130 and a diffusion plate 160, such that the color of dark area 150 appeared on the diffusion plate 160 becomes much lighter.

The optical films 140 disposed sequentially from bottom to top include a 0 degree lens, a 90 degree lens, and a brightness enhancement film, but not limited herein. The bottom plate 110 may be a reflector which increases light utilization efficiency. The support structure is made of a rigid material (e.g., acrylic materials, plastic materials, and metal materials). The surface of the support structure 130 may be a polishing surface, a frosting surface, a reflector surface, or a scattering surface. The cross-section of the support structure 130 may be a circle shape, an elliptic shape, a regular polygon shape, an irregular polygon shape, or a saw-tooth shape. The support structure 130 may be a pyramid, a cone, a cylinder, or a prism.

Referring to FIG. 5 illustrates a liquid crystal display device according to an embodiment of the present invention. The liquid crystal display device 2 comprises a liquid crystal panel 210 and a direct type backlight unit 220. The direct type backlight unit 220 provides light to the liquid crystal panel 210 for displaying an image. In one embodiment of the present invent, the direct type backlight unit 220 is the above mentioned the direct type backlight unit of embodiment of the present invention, wherein the liquid crystal display device 2 may further comprise a plastic frame, a front frame, a back cover, and so on, but the details of these devices and related structures are prior art and will be omitted herein.

As the foregoing, the direct type backlight unit and the liquid crystal display device using the same of the present invention has the following advantageous effect: by reducing a height of a support structure, a spacing is existed between the supporting structure and an optical film; therefore, the light emitted from the LEDs can pass through the spacing between the support structure and a diffusion plate, such that it can improve problems that a dark area occurs on the diffusion plate.

The previous description of the preferred embodiment is provided to further describe the present invention, not intended to limit the present invention. Any modification apparent to those skilled in the art according to the disclosure within the scope will be construed as being included in the present invention.

What is claimed is:

1. A direct type backlight unit, comprising:
an optical film;
a diffusion plate, for supporting the optical film;
a bottom plate, disposed under the diffusion plate;
a plurality of light emitted diodes, disposed between the diffusion plate and the bottom plate; and
a plurality of support structures, disposed between the diffusion plate and the bottom plate and fixed on the bottom plate, wherein each support structure is disposed between two adjacent light emitting diodes, a height of each support structure is smaller than a distance between the bottom plate and the diffusion plate,
wherein a distance between the bottom plate and the diffusion plate is a cavity height (Hc),
a distance between the bottom plate and a top end of the support structure is a support structure height (Hs), a distance between the support structure and the light emitting diode is a spacing (S), wherein the cavity height (Hc), the support structure height (Hs), and the spacing (S) need to satisfy an equation of $(Hc-Hs) \times S/Hs \geq 3.5$ mm, a surface of the support structure is a polishing surface, a frosting surface, a reflector surface, or a scattering surface, and a cross-section of the support structure is a circle shape, an elliptic shape, a regular polygon shape, an irregular polygon shape, or a saw-tooth shape.

2. A direct type backlight unit, comprising:
an optical film;
a diffusion plate, for supporting the optical film;
a bottom plate, disposed under the diffusion plate;
a plurality of light emitted diodes, disposed between the diffusion plate and the bottom plate; and
a plurality of support structures, disposed between the diffusion plate and the bottom plate and fixed on the bottom plate, wherein each support structure is disposed between two adjacent light emitting diodes, a height of each support structure is smaller than a distance between the bottom plate and the diffusion plate,
wherein a distance between the bottom plate and the diffusion plate is a cavity height (Hc), a distance between the bottom plate and a top end of the support structure is a support structure height (Hs), a distance between the support structure and the light emitting diode is a spacing (S), wherein the cavity height (Hc), the support structure height (Hs), and the spacing (S) need to satisfy an equation of $(Hc-Hs) \times S/Hs \geq 3.5$ mm.

3. The direct type backlight unit of claim 2, wherein a surface of the support structure is a polishing surface, a frosting surface, a reflector surface, or a scattering surface.

4. The direct type backlight unit of claim 2, wherein a cross-section of the support structure is a circle shape, an elliptic shape, a regular polygon shape, an irregular polygon shape, or a saw-tooth shape.

5. The direct type backlight unit of claim 2, wherein the support structure is a pyramid, a cone, a cylinder, or a prism.

6. A liquid crystal display device, comprising:
a liquid crystal panel; and
a direct type backlight unit for providing light to the liquid crystal panel, comprising:
an optical film;
a diffusion plate, for supporting the optical film;
a bottom plate, disposed under the diffusion plate;
a plurality of light emitted diodes, disposed between the diffusion plate and the bottom plate; and
a plurality of support structures, disposed between the diffusion plate and the bottom plate and fixed on the bottom plate, wherein each support structure is disposed between two adjacent light emitting diodes, a height of each support structure is smaller than a distance between the bottom plate and the diffusion plate,
wherein the distance is a height of a cavity (Hc) from the bottom plate to diffusion plate, a distance is a height of the support structure (Hs) from the bottom plate to a top end of the support structure, a space (S) is a distance between the support structure and the light emitting diode, the height of the cavity (Hc), the height of the support structure (Hs), and the space (S) need to satisfy $(Hc-Hs) \times S/Hs \geq 3.5$ mm.

7. The liquid crystal display device of claim 6, wherein a surface of the support structure is polishing surface, frosting surface, reflector surface, or scattering surface.

8. The liquid crystal display device of claim 6, wherein a section of the support structure is circle shape, elliptic shape, regular polygon shape, irregular polygon shape, or saw-tooth shape.

9. The liquid crystal display device of claim 6, wherein the support structure is pyramid, cone, cylinder, or prism.

* * * * *